United States Patent
Ando et al.

[19]

[11] Patent Number: 6,127,054
[45] Date of Patent: Oct. 3, 2000

[54] METHOD OF AND APPARATUS FOR POWER GENERATION

[75] Inventors: Yuji Ando; Tadayoshi Tanaka; Takuya Doi, all of Tsukuba; Takumi Takashima, Shimodate, all of Japan

[73] Assignee: Agency of Industrial Science and Technology, Tokyo, Japan

[21] Appl. No.: 09/114,091

[22] Filed: Jul. 13, 1998

Related U.S. Application Data

[63] Continuation-in-part of application No. 08/617,276, Mar. 14, 1996, abandoned.

[30] Foreign Application Priority Data

May 30, 1995 [JP] Japan ..................................... 7-131302

[51] Int. Cl.[7] .............................. H01M 8/18; H01M 6/36
[52] U.S. Cl. ................................. 429/11; 429/17; 429/20; 429/50; 429/72; 429/101; 429/112
[58] Field of Search .................................. 429/11, 17, 19, 429/20, 101–105, 49, 50, 72, 112

[56] References Cited

U.S. PATENT DOCUMENTS

| | | |
|---|---|---|
| 2,890,259 | 6/1959 | Weininger . |
| 3,311,506 | 3/1967 | Senderoff . |
| 3,357,860 | 12/1967 | Stachurski . |
| 3,357,862 | 12/1967 | Greenberg et al. . |
| 3,536,530 | 10/1970 | Anthes et al. . |
| 4,454,207 | 6/1984 | Fraioli et al. ............................. 429/17 |
| 4,738,904 | 4/1988 | Ludwig et al. ............................ 429/17 |
| 4,833,046 | 5/1989 | Roy ........................................ 429/50 |
| 5,087,534 | 2/1992 | Ludwig ..................................... 429/11 |
| 5,208,112 | 5/1993 | Ludwig et al. ............................ 429/20 |
| 5,264,298 | 11/1993 | Townsend ................................. 429/17 |
| 5,470,669 | 11/1995 | Ludwig et al. ............................ 429/17 |

FOREIGN PATENT DOCUMENTS 0 540913  5/1993  European Pat. Off. .

OTHER PUBLICATIONS

Ikeshoji, T., "A Review about Electrochemical Energy Conversion from Heat to Electricity", Report Of The Govt. Industrial Research Inst., Tohoku, vol. 17, Mar. 1984, pp. 39–56.

*Primary Examiner*—Maria Nuzzolillo
*Assistant Examiner*—Jonathan Crepeau
*Attorney, Agent, or Firm*—Venable; Robert J. Frank; Ashley J. Wells

[57] ABSTRACT

Thermal decomposition of a reactant, XY, proceeds on a negative catalytic electrode to form products, X and Y. The product Y is a cellular reaction material, which separates into ions, $Y^+$, and electrons, $e^-$, on the negative catalytic electrode. The ions $Y^+$ move through a solid electrolyte, the electrons $e^-$ pass through an external resistor, and the product X formed on the negative catalytic electrode is circulated to the positive catalytic electrode, therefore reproducing the reactant XY. Since the cellular reaction material Y need not be released from the top of the catalytic electrode, the invention is adapted to convert heat energy into electric energy efficiently as compared with conventional methods. In one embodiment, reactant XY is 2-propanol, and products X and Y are acetone and hydrogen, respectively.

9 Claims, 3 Drawing Sheets

METHOD OF AND APPARATUS FOR POWER GENERATION

This is a continuation-in-part of application Ser. No. 08/617,276 filed Mar. 14, 1996, now abandoned.

BACKGROUND OF THE INVENTION

1. Field of the Invention

The present invention relates to a method of and an apparatus for power generation intended to convert various thermal energies, such as waste heat, into electric energy via chemical reactions.

2. Description of the Prior Art

A reactant reproducible type heat fuel cell has thus far been used as a device for converting thermal energy into electric energy via a chemical reaction without involving the exchange of materials between a power generating apparatus and the outside. This device reproduces the reactants by causing a reaction, reverse to the cellular reaction, to proceed thermally by use of a catalyst. This type of device is, for example, disclosed in Report of the Govt. Industrial Research Inst., Tohoku, Vol. 17, pp. 39–56, (March 1984) by Tamio Ikesyoji. This is shown in FIG. 1.

In FIG. 1, the numerals 10 and 11 represent reactant inlets on the negative electrode side and the positive electrode side, respectively; 12 and 13, product outlets on the negative electrode side and the positive electrode side, respectively; 14, a negative electrode; 15, an electrolyte; 16, a positive electrode; 17, a catalytic reactor; and 18, an external resistor. The symbols A and B signify reactants for a cellular reaction; and C and D, products from the cellular reaction. Hydrazine ($N_2H_4$) is exemplified as A, oxygen ($O_2$) as B, nitrogen ($N_2$) as C, and water ($H_2O$) as D. If hydrogen. ($H_2$) is used as A, and oxygen ($O_2$) as B, there is no product corresponding to C, and water ($H_2O$) is formed as D. In FIG. 1, a heating means for applying heat energy to be converted into electric power is omitted.

As shown in FIG. 1, the reactant A is introduced from the negative electrode-side reactant inlet 10, and the reactant B is introduced from the positive electrode-side reactant inlet 11, whereafter the products C, D, respectively, are formed. During this process, electrons migrate from the negative electrode 14 to the positive electrode 16, producing electric energy. The resulting products C, D pass the negative electrode-side product outlet 12 and the positive electrode-side product outlet 13, respectively, entering the catalytic reactor 17. There, the products C, D form the reactants A, B by a the reverse reaction to the cellular reaction. The reactants A, B thus reproduced are introduced into the negative electrode-side reactant inlet 10 and the positive electrode-side reactant inlet 11, and used for the cellular reaction again.

This system is advantageous in that electric energy is obtained from heat energy without any materials exchanged between the power generator and the outside.

In the conventional reactant reproducible type heat fuel cell, however, a solid catalyst is used for the catalytic reactor 17. Thus, at low reaction temperatures, even when the reactants A, B are reproduced on the catalyst, they are not easily released. To promote their release, it has been necessary to employ a somewhat high reaction temperature.

This necessity was ascribed to the independence of the fuel cell portion and the catalytic reactor 17 from each other. Because of this independence, the reactants A, B had to be introduced into the negative electrode-side and positive electrode-side reactant inlets 10, 11 after being reproduced in the catalytic reactor 17 and released therefrom.

SUMMARY OF THE INVENTION

The object of this invention is to provide a method of and an apparatus for power generation which do not require reactant reproduction and release steps performed in conventional catalytic reactors.

To attain this object, the method of power generation comprises constructing a positive electrode and a negative electrode from catalytic electrodes and interposing an electrolyte between both catalytic electrodes; contacting a reactant with the negative catalytic electrode while applying heat to the positive electrode and the negative electrode effective to form decomposition products on the negative catalytic electrode by catalytic reaction; and reproducing the reactant on the positive catalytic electrode by reacting the decomposition products, followed by circulating the reproduced reactant to the negative catalytic electrode to make it available for decomposition by contract with the negative catalytic electrode.

The heat applied to the positive electrode and the negative electrode may be solar heat or any type of waste heat.

The apparatus for power generation concerned with the present invention comprises a negative electrode integrated with a catalyst for proceeding a reaction for producing a cellular reaction material from a reactant by catalytic reaction with heating; a positive electrode integrated with a catalyst for proceeding a reaction for reproducing the reactant from the cellular reaction material and the rest of the decomposition product; an electrolyte interposed between the negative electrode and the positive electrode; and a circulating means for transferring the reproduced reactant to the negative electrode, and also transferring the rest of the decomposition product from the negative electrode to the positive electrode.

According to the method of and apparatus for power generation of the present invention, if a heat source of a certain temperature exists, there is no need to release the reactant from the top of the catalyst, since the catalyst and electrodes are integrated to form catalytic electrodes. Thus, more electric energy than by conventional methods can be obtained.

If solar heat is used as the heat source, a clean type of power generation can be performed without requiring any special heating means.

The cellular reaction material formed on the negative catalytic electrode can be used for the cellular reaction without the need for its release from the top of the catalytic electrode. Thus, the reaction temperature of the thermal decomposition reaction of the reactant on the negative catalytic electrode can be set to be lower than that used in the conventional catalytic reactor.

Hence, heat in a lower temperature range than in the conventional method can be converted into electric energy.

The above and other objects, effects, features and advantages of the present invention will become more apparent

DETAILED DESCRIPTION OF PREFERRED EMBODIMENTS

Embodiment 1

Figure 1:
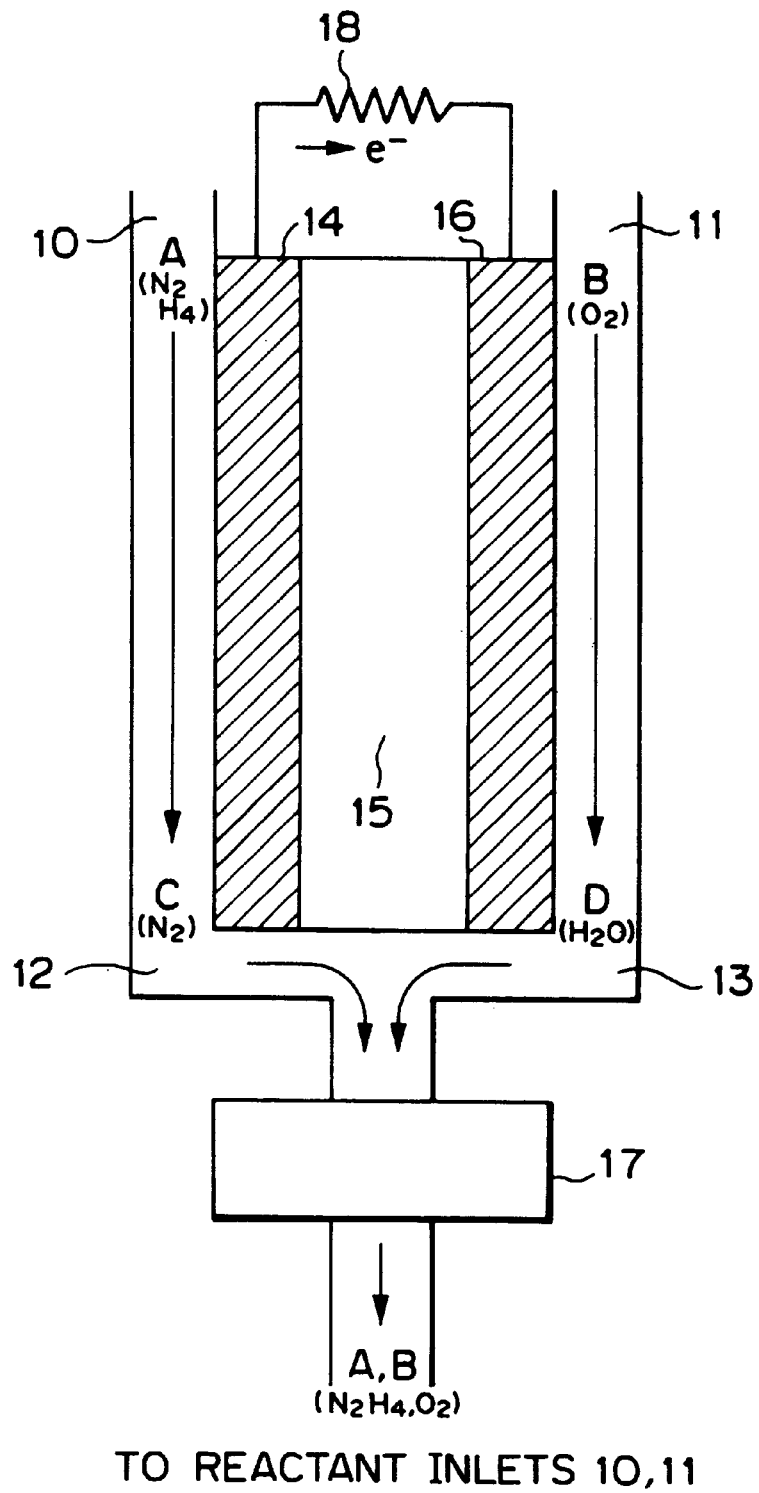
FIG. 1 is a schematic structural view showing an example of a fuel cell, a conventional power generator.
Figure 2:
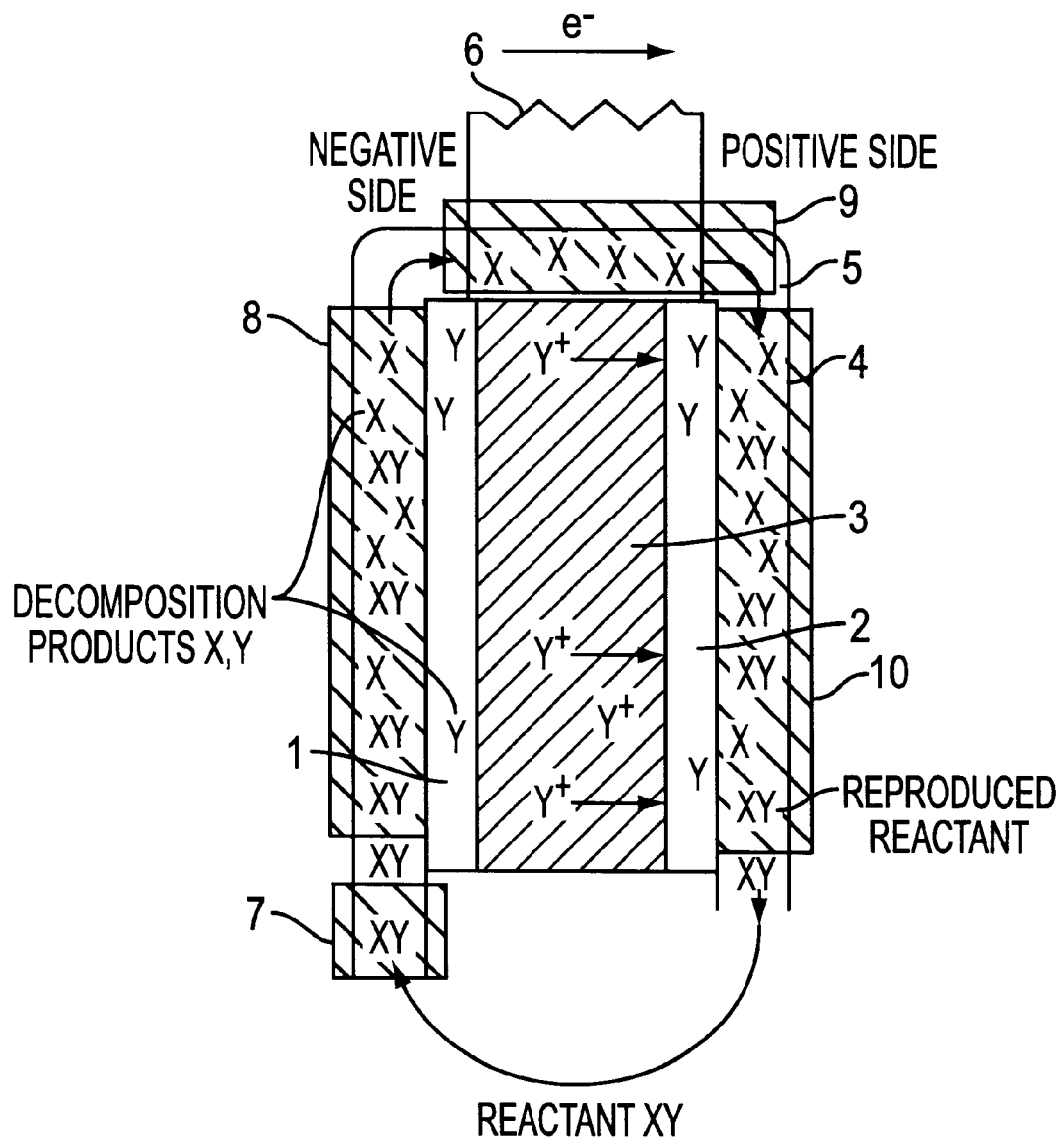
FIG. 2 is a sectional view showing an outlined structure of a first embodiment of the apparatus for power generation of the present invention.

FIG. 2 is a sectional view showing an outlined structure of a first embodiment of the apparatus for power generation of the present invention.

In FIG. 2, the numeral 1 signifies a negative catalytic electrode, 2 a positive catalytic electrode, 3 a solid electrolyte, and 4 a housing covering the entire system and forming a circulation passageway 5 as a circulating means on the outer peripheries of both catalytic electrodes 1, 2. The numeral 6 represents an external resistor.

The numeral 7 represents a preheater formed around the inlet of the circulation passageway 5. The numeral 8 represents a heater formed around the part of the circulation passageway 5 adjacent to the negative catalytic electrode 1. The numeral 9 represents a precooler formed around the part of the circulation passageway 5 between the negative catalytic electrode 1 and the positive catalytic electrode 2. The numeral 10 represents a cooler formed around the part of the circulation passageway 5 adjacent to the positive catalytic electrode.

Next, the actions of the apparatus will be described. XY denotes a reactant, and X, Y signify products by thermal decomposition, of which the Y is a cellular reaction material.

On the negative catalytic electrode 1, the reactions $$XY \leftrightarrow X+Y \quad (1)$$

and $$Y \leftrightarrow Y^+ + e^- \quad (2)$$

take place.

On the positive catalytic electrode 2, the reaction $$X+Y^++e^- \leftrightarrow XY \quad (3)$$

occurs.

The reaction from the left to the right side and the reaction from the right to the left side in the formula (1) are processing simultaneously. Thus, "XY" and "X+Y" have reached their dynamic equilibrium state. When 2-propanol is used as the reactant XY, the product X is acetone, and the material Y is a hydrogen atom in formula (1). The higher the reaction temperature of the negative catalytic electrode 1 is, the more the equilibrium is shifted to the right side. On the other hand, in formula (3), the lower the reaction temperature of the positive catalytic electrode 2 is, the more the equilibrium is shifted to the right side. When the negative catalytic electrode 1 and the positive catalytic electrode 2 are the same in their temperature, the $Y^+$ on the negative catalytic electrode 1 generated according to formulae (1) and (2), and the $Y^+$ on the positive catalytic electrode 2 represented in formula (3) are the same in their concentration. Thus, $Y^+$ cannot move through the solid electrolyte 3 and electric current cannot flow.

When the negative catalytic electrode 1 and the positive catalytic electrode 2 are different in their temperature, the electric current flows constantly because $Y^+$ on the negative catalytic electrode 1 and $Y^+$ on the positive catalytic electrode 2 are different in their concentrations at a stationary state of the reaction. It is necessary to set the concentration of the $Y^+$ on the negative catalytic electrode 1 to be larger than the concentration of the $Y^+$ on the positive catalytic electrode 2 in order to move the $Y^+$ from the negative catalytic electrode 1 to the positive catalytic electrode 2. For this reason, the temperature should be set so that the temperature of the negative catalytic electrode 1 is larger than the temperature of the positive catalytic electrode 2. When there is a difference in the temperature between the negative catalytic electrode 1 and the positive catalytic electrode 2, even if it is very slight, the electric current may flow theoretically.

Therefore, as a whole, the reaction $$XY \rightarrow X+Y \rightarrow XY$$

takes place, so that the cell acts as a thermally driven cell. As metioned above, the negative catalytic electrode 1 and the positive catalytic electrode 2 need to be different in the reaction temperature.

Embodiment 2

Figure 3:
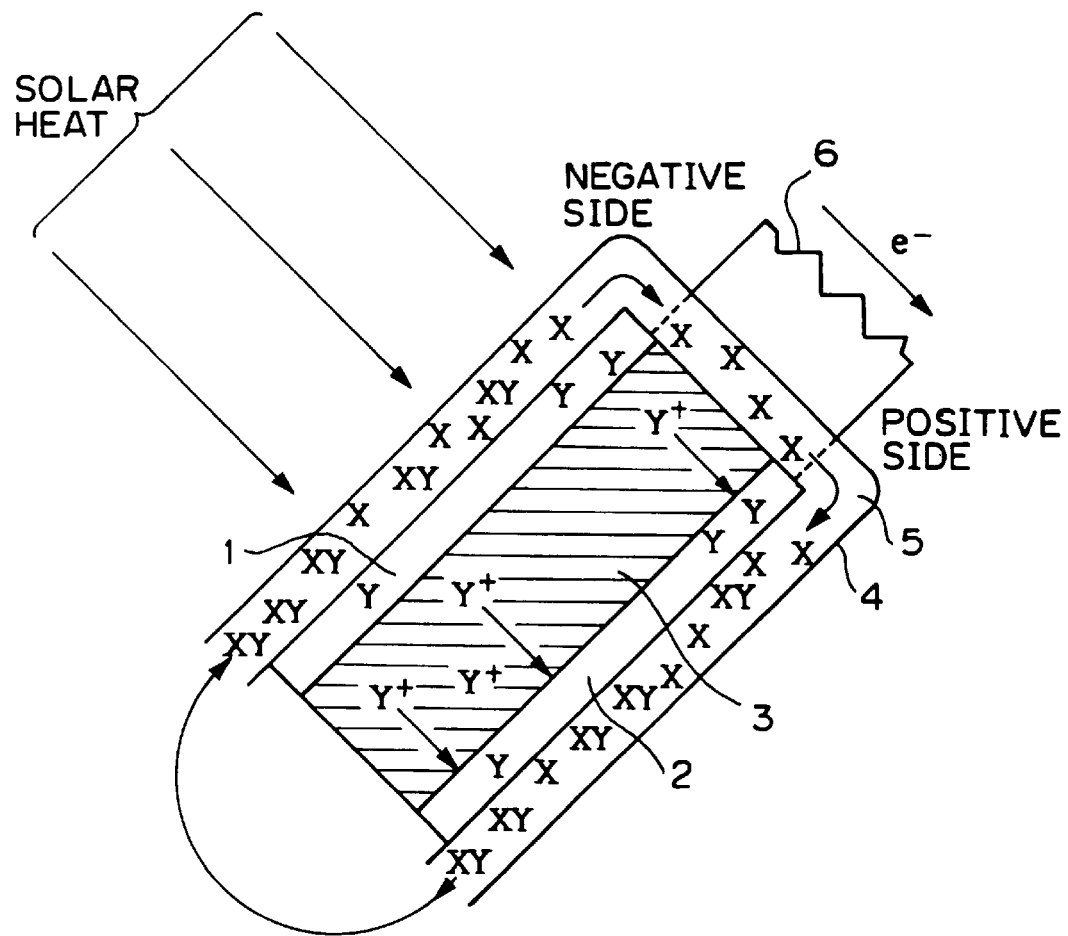
FIG. 3 is a sectional view showing an outlined structure of a second embodiment of the apparatus for power generation of the present invention.

FIG. 3 shows an outlined structure of a thermally driven cell using solar heat as a second embodiment of the present invention. In FIG. 3, when 2-propanol ($CH_3CHOHCH_3$) is used as the reactant XY, the decomposition product X is acetone ($CH_3COCH_3$), and the cellular reaction material Y is a hydrogen atom (H). Examples of the catalytic electrodes 1, 2 and the solid electrolyte 3 are palladium carried carbon, platinum carried carbon, and Nafion®, respectively. Nafion® which is commercially available from E. I. Du Pont de Nemours and Company is proton exchange membrane fabricated from copolymers of tetrafluoroethylene and perfluorinated monomers containing sulfonic or carboxylic acid groups.

The temperature in the vicinity of the catalytic electrode 1 is set at about the boiling point of 2-propanol (82.4° C.). The heat source is, say, solar heat. The temperature in the vicinity of the catalytic electrode 2 is set at about room temperature.

Next, the reactions will be described.

On the negative catalytic electrode 1, the reactions $$CH_3CHOHCH_3 \rightarrow CH_3COCH_3 + 2H$$
$$2H \rightarrow 2H^+ + 2e^-$$

take place.

On the positive catalytic electrode 2, the reaction $$CH_3COCH_3 + 2H^+ + 2e^- \rightarrow CH_3CHOHCH_3$$

occurs.

As a whole, the reaction $$CH_3CHOHCH_3 \rightarrow CH_3COCH_3 + 2H \rightarrow CH_3CHOHCH_3$$

takes place, so that the cell acts as a thermally driven cell.

More specifically, the reactant 2-propanol is decomposed into acetone and hydrogen atoms on the catalytic electrode 1. The hydrogen atoms are divided into protons and electrons on the negative catalytic electrode 1. The protons move in the solid electrolyte 3, reaching the positive catalytic electrode 2, while the electrons pass through the external resistor 6, reaching the positive catalytic electrode 2. The acetone formed on the negative catalytic electrode 1 migrates to the positive catalytic electrode 2, where it receives the protons and electrons, reproducing 2-propanol. The resulting 2-propanol moves to the negative catalytic electrode 1, repeating the same cycle. With this cycle, a direct current is obtained as an output by supplying only heat of about 80° C. as an input. In this case, the resulting electric power corresponds to the change in free energy caused by the reaction in which acetone reacts with hydrogen to form 2-propanol.

The above thermally driven cell enables thermal energy such as solar energy to be converted into electric energy efficiently.

Needless to say, other types of heat than solar heat may be used as the heating means. The solid electrolyte 3 has the advantage of being easy to handle, but generally any electrolyte will suffice.

Examples of the reactant XY, the decomposition product X, and the cellular reaction material Y include the following:

| XY | X | Y |
| --- | --- | --- |
| Methanol | Formaldehyde | Hydrogen |
| Ethanol | Acetaldehyde | Hydrogen |
| Cyclohexanol | Cyclohexanone | Hydrogen |
| Cyclohexane | Benzene | Hydrogen |
| Ethylcyclohexane | Ethylbenzene | Hydrogen |
| Methylcyclohexane | Toluene | Hydrogen |
| Benzyl alcohol | Benzaldehyde | Hydrogen |
| Diphenyl methanol | Benzophenone | Hydrogen |

The power generation method and apparatus of the present invention involve integrating a catalyst for a reaction, which reproduces a reactant from the decomposition product of a cellular reaction, with an electrode to form a catalytic electrode. Thus, they can reproduce the product of the cellular reaction into the reactant thermally by the catalytic electrode on the positive side. Moreover, they are free from the necessity for releasing the cellular reaction material from the positive catalytic electrode, thus permitting production of more electric energy from a certain heat source than by the conventional method. Furthermore, they can set the decomposition reaction temperature to be lower than in the conventional method. Therefore, load on the environment is also reduced.

In addition, power generation using solar heat as a heat source has an advantage in becoming a clean type of power generation requiring no special heating device.

The present invention has been described in detail with respect to preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. A method of power generation by converting thermal energy into electric energy via a reversible chemical reaction, the method comprising the steps of:

a. providing a positive catalytic electrode comprised of a catalyst and a negative catalytic electrode comprised of a catalyst from which an electric current for power generation is to be taken;

b. interposing an electrolyte between the positive catalytic electrode and the negative catalytic electrode;

c. heating the positive catalytic electrode and the negative catalytic electrode to respective temperatures which are different the temperature of the negative catalytic electrode being effective to form decomposition products of a reactant at the negative catalytic electrode by catalytic reaction of the reactant;

d. contacting the negative catalytic electrode with the reactant under conditions effective to catalytically react and form the decomposition products thereof, which decomposition products include a cellular reaction material for cellular reaction for power generation;

e. contacting the positive catalytic electrode with the decomposition products under conditions effective to reactively reproduce the reactant on the positive catalytic electrode; and f. circulating the reproduced reactant to the negative catalytic electrode, wherein the reactant is 2-propanol which decomposes into acetone and a hydrogen atom, the hydrogen atom being the cellular reaction material and being divided into a proton and an electron on the negative catalytic electrode, the protons moving in the electrolyte and reaching the positive catalytic electrode, and wherein the temperature of the negative catalytic electrode is about the boiling point of the 2-propanol.

2. The method as claimed in claim 1, wherein the conditions effective to form the decomposition products by contacting the negative catalytic electrode with the reactant in step (d) and the conditions effective to reactively reproduce the reactant on the positive catalytic electrode by contacting the positive catalytic electrode with the decomposition products in step (e) consist of respective temperature.

3. The method as claimed in claim 1, wherein the temperature of the negative electrode is higher than the temperature of the positive electrode.

4. The method as claimed in claim 1, wherein the positive catalytic electrode and the negative catalytic electrode are heated to respective temperatures which are different by applying one of solar heat or waste heat thereto.

5. An apparatus for power generation by converting thermal energy into electric energy via a reversible chemical reaction, comprising:

a housing;

a negative catalytic electrode provided in the housing which is comprised of a catalyst and which is heated in use to a first temperature effective to decompose a reactant into decomposition products by catalytic reaction, which decomposition products include a cellular reaction material for cellular reaction for power generation;

a positive catalytic electrode provided in the housing which is comprised of a catalyst and which is heated in use to a second temperature effective to reactively reproduce the reactant from the decomposition products including the cellular reaction material and different from the first temperature;

heating means for heating the negative catalytic electrode to the first temperature and for heating the second catalytic electrode to the positive temperature, the first temperature being higher than the second temperature in use;

an electrolyte interposed between the negative catalytic electrode and the positive catalytic electrode for transporting the cellular reaction material from the negative catalytic electrode to the positive catalytic electrode; and circulating means provided in the housing for transferring the reproduced reactant from the positive catalytic electrode to the negative catalytic electrode and for transferring the decomposition products except for the cellular reaction material from the negative catalytic electrode to the positive catalytic electrode.

6. The apparatus as claimed in claim 5, wherein the first temperature is effective to form the decomposition products by contacting the negative catalytic electrode with the reactant and the second temperature is effective to reactively reproduce the reactant on the positive catalytic electrode by contacting the positive catalytic electrode with the decomposition products.

7. The apparatus as claimed in claim 5, wherein the heating means is solar heat.

8. The apparatus as claimed in claim 5, wherein the heating means is waste heat.

9. The apparatus as claimed in claim 5, wherein the reactant is a material which decomposes to produce a hydrogen atom as the cellular reaction material.

* * * * *